May 31, 1949.  C. L. PHILLIPS  2,471,540

TRAP

Filed Oct. 8, 1946

Inventor
CHARLES L. PHILLIPS,

By McMorrow, Berman & Davidson
Attorneys

Patented May 31, 1949

2,471,540

UNITED STATES PATENT OFFICE 2,471,540

TRAP

Charles L. Phillips, St. George, N. Y.

Application October 8, 1946, Serial No. 702,011

1 Claim. (Cl. 43—71)

This invention relates to rodent traps.

It is an object of the present invention to provide a rodent trap wherein the mice and rats will be killed in a humane and sanitary manner, as by drowning.

It is another object of the invention to provide a trap which is of simple construction wherein riveting, soldering or welding is unnecessary in forming the trap.

It is another object of the invention to provide a rodent trap which needs no setting and which has no wires, springs, trap doors or other devices to get out of order or to shock, alarm or injure one.

It is another object of the invention to provide a trap which will be free of smell of dead rodents which would reduce the attractiveness of the trap to a subsequent rodent.

According to the invention, a large vessel filled with water supports an upper compartment into which the rat or mouse enters for the purpose of gaining access to food carried upon a turntable three-blade structure. In trying to gain access to the bait on the one blade, he will tend to rotate the blade structure until it has rotated over a hole in the bottom of the compartment through which he will drop into the water contained in the bottom vessel. Means is provided for preventing return rotation of the blade structure so once the blade structure has rotated beyond the entrance opening in the side wall of the compartment, the rat or mouse cannot return for escape through the entrance opening. The blade structure turns only in one direction and is not returnable.

For other objects and a better understanding of the invention, reference may be had to the following detailed description taken in connection with the accompanying drawings, in which.

Figure 1:
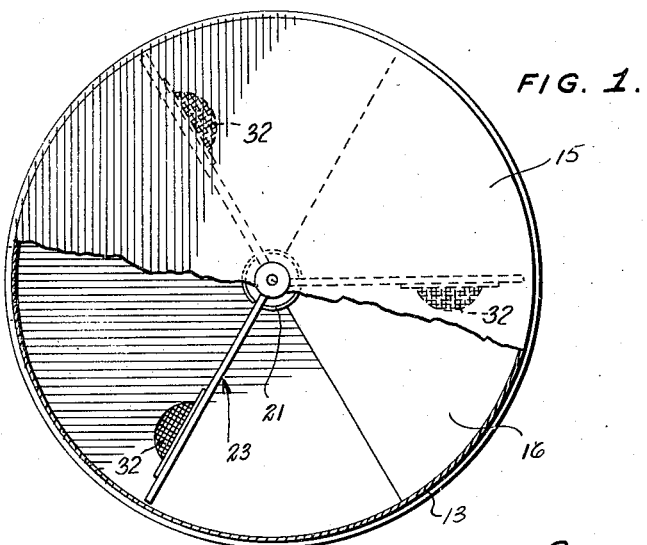
Figure 1 is a top plan view with a portion of the cover broken away to show one of the blades of the rotating structure.
Figure 3:
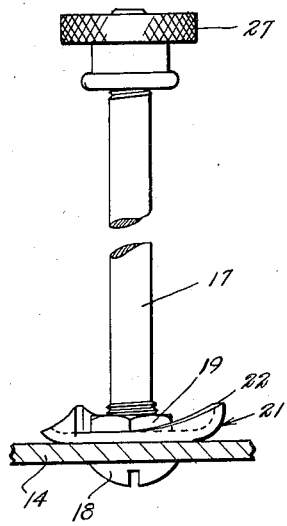
Figure 3 is an enlarged elevational view of the vertically extending pivot pin.
Figure 2:
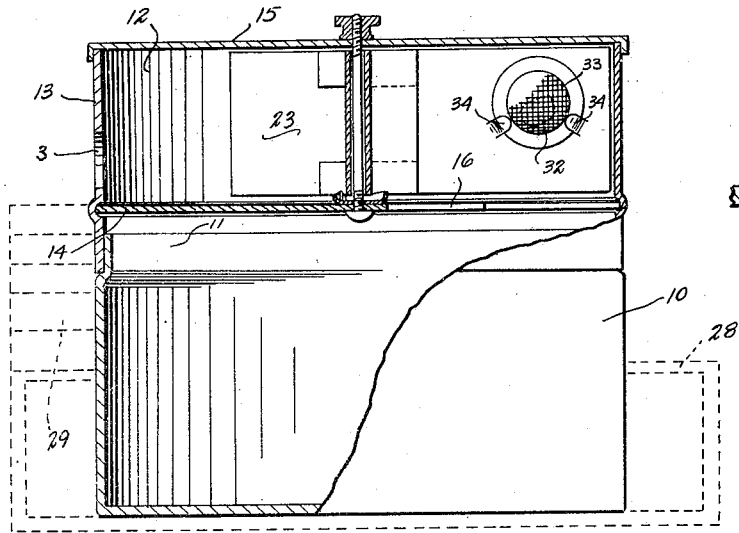
Figure 2 is a side elevational view with a portion broken away to show the interior of the vessel containing the water and the compartment where the rodent is received.
Figure 4:
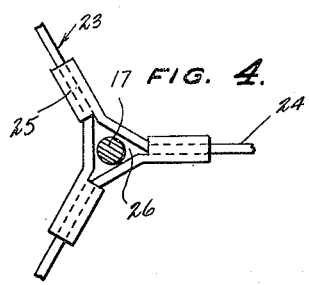
Figure 4 is a fragmentary plan view of the center of the blade structure which fits over the pin.

Referring now to the figures, 10 represents a vessel adapted to contain a body of water and which is inwardly offset at its top portion 11 to receive a top compartment 12 formed of an annular ring member 13, a partial floor 14 and a cover 15 which is removable.

The floor 14 has an opening 16 for about one-third of its area. The rat or mouse will drop through this opening into the body of water within the vessel 10. Projecting upwardly through the floor 11 is a pivot pin 17 headed, as indicated on its lower end at 18, and threaded to receive a nut 19 adapted to retain a cupped washer 21 having upstanding saw-tooth edges 22 located 120° apart. Fitted down over the pivot pin 17 is a blade structure 23 having three radially extending blades 24 locked together at their inner ends by overlapping portions 25 and the inner ends being so shaped as to provide a central opening 26 adapted to receive the pin 17. The lower edges of the blades cooperate with the saw teeth 22 and prevent the rotation of the blade structure in a reverse direction from which it is intended that the blade structure rotate. After the blade structure has been inserted upon the pin 17, the cover 15 can be fitted over the top of the ring member 13 to close the same. It is retained in place by a thumb screw 27 threaded upon the upper end of the pin 17.

The rat or mouse, in order to gain access to the trap, will jump onto a platform 28 that surrounds the vessel 10 and will walk thereon until he arrives at steps 29 where he can walk upwardly to gain access to the upper compartment 12 through an opening 31 in the ring member 13. Upon entering the compartment 12, it will be attracted to bait 32 carried in a screen container 33 retained on each of the blades by struck-out lip projections 34. On approaching the bait, the rat or mouse will cause the blade structure to be rotated upon the pin 17 and over the saw teeth 22 of the member 21, so that reverse rotation of the blade structure is prohibited. When sufficient turning movement has been effected, the rat or mouse will arrive at the opening 16 in the floor 14 and will drop immediately into the water within the vessel 10 and be drowned. Since the bait is confined within the compartment 5, so that access cannot be had to the bait from either side thereof, the same bait will remain in the trap over a long period of time while catching a large number of rats or mice with it.

While various changes may be made in the detailed construction, it shall be understood that such changes shall be within the spirit and scope of the present invention as defined by the appended claim.

I claim:

An animal trap, comprising a lower casing for holding water and having its top open, an upper casing having a side and bottom with the side projecting downwardly below the bottom to form a flange to be detachably mounted upon the upper open end of the lower casing, the bottom of the upper casing having a large outlet opening formed therein and the side having a small inlet opening, a cap removably mounted upon the upper end of the upper casing, a vertical bolt passing through the bottom and cap of the upper casing, a removable nut detachably engaging the bolt and disposed exteriorly of the cap, a rotatable element arranged within the upper casing and including radial vanes and a hub having an opening for receiving the bolt, the hub being removable from the bolt by an upward vertical movement, a toothed element mounted upon the lower portion of the bolt adjacent to the bottom of the upper casing for engaging the lower edges of the vanes, and a bait holding receptacle having a part contacting with the face of one vane and secured to such vane, the vane closing one side of the bait holding receptacle.

CHARLES L. PHILLIPS.

REFERENCES CITED

The following references are of record in the file of this patent:

UNITED STATES PATENTS

| Number | Name | Date |
| --- | --- | --- |
| Re. 4,113 | Lee | Aug. 30, 1870 |
| 832,142 | Mathews | Oct. 2, 1906 |
| 1,059,896 | Miller | Apr. 22, 1913 |
| 1,350,958 | Davis | Aug. 24, 1920 |
| 1,607,949 | Hanuljak | Nov. 23, 1926 |